May 24, 1960  P. L. J. M. ROZYCKI  2,937,457
TRAINING GEAR FOR ELEMENTARY FLYING INSTRUCTION
Filed July 25, 1956  2 Sheets-Sheet 1

# 2,937,457

TRAINING GEAR FOR ELEMENTARY FLYING INSTRUCTION

Paulin Leon Joseph Marie Rozycki, Neuilly-sur-Seine, France, assignor to Societe Commerciale ECA, Asnieres, Seine, France Filed July 25, 1956, Ser. No. 599,972

Claims priority, application France Aug. 1, 1955

8 Claims. (Cl. 35—12)

This invention relates to a training gear for the elementary teaching of aircraft piloting, that is an apparatus equipped with controls similar to those of an aircraft and simulated indicating instruments responsive to said controls to give indications comparable to those which would appear on true indicating instruments provided on the dash-board of an aircraft actually flying.

The training gear according to the invention comprises a joy-stick for controlling aileron and elevator controls simulating those of an aircraft, a pair of pedals controlling a rudder control simulating that of said aircraft, means adapted to urge said stick and said pedals to their neutral position and to simulate the hinge moments of the actual control surfaces of said aircraft, said three simulated controls comprising, with respect to the three axes of motion in flight, i.e. the rolling, pitching and yawing axes, a device simulating the stabilizing characteristics of the tail assembly of said aircraft and a device simulating the aerodynamic damping effects of said aircraft while the simulated aileron and elevator controls further comprise a device for generating the inertia effects of said aircraft. The combination of these three devices by means of combining members provides the true representation of the flying equations of the plane on suitable simulated indicating instruments. The training gear is advantageously arranged in a cabin structure having opaque walls with translucent panels, so that the pilot may be put under blind flying conditions.

The "combining members," consisting preferably of lever systems, are adapted to introduce a single variable simultaneously into two simulated controls, such as the simulated elevator and rudder control, and to geometrically solve functions of several variables.

Advantageously, with respect to a flying axis, the stabilizing characteristics of the tail assembly of said aircraft are simulated by a resilient system with or without a linear law of variation such as a spring, the characteristics of inertia by an adjustable pendulum, in unstable condition, and the aerodynamic damping effects by a brake, of the dash-pot type, adjustable if wanted.

In an advantageous embodiment of the invention, the training gear comprises as indicating instruments a simulated artificial-horizon for both the fore-and-aft and lattral trims, a simulated anemometer, a simulated turn-and-bank-indicator, a simulated clinometer and a simulated compass.

The invention will be better understood and other features thereof will appear by means of the following description of a preferred embodiment with reference to the accompanying drawings, in which.

Figure 1:
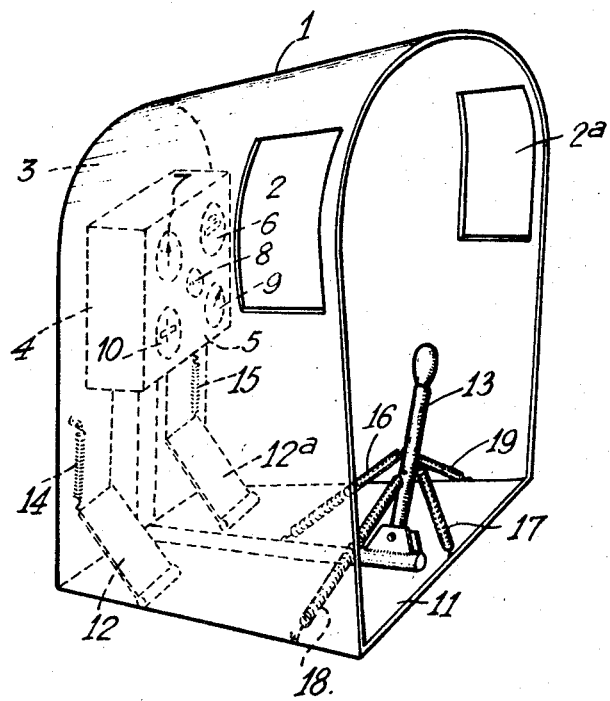
Fig. 1 is a general view of the training gear for aircraft piloting.
Figure 2:
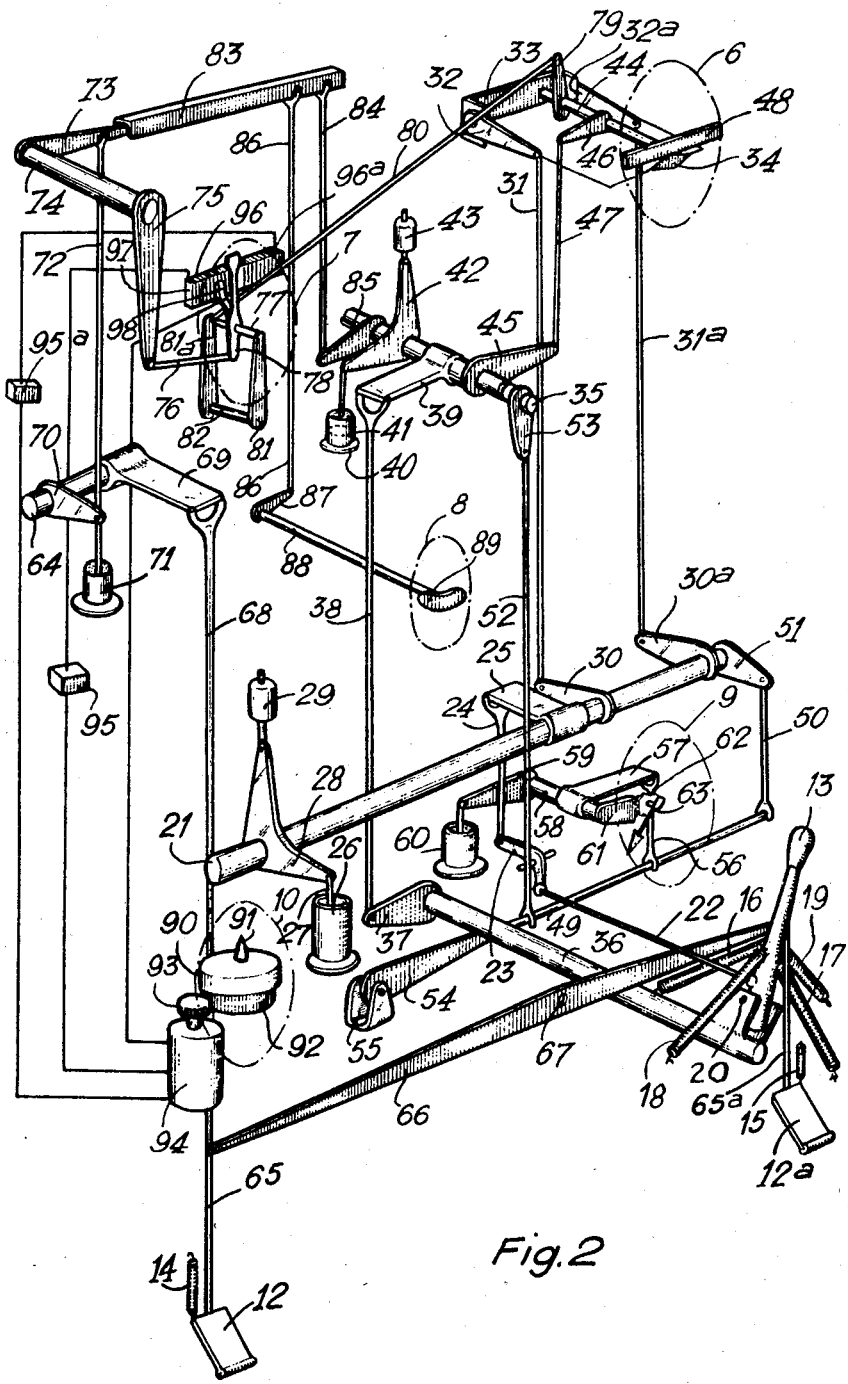
Fig. 2 is a detached perspective view of the mechanism included in the training gear illustrated in Fig. 1.

Referring to the drawings, the training gear comprises a casing 1, in the form of a cabin, provided with translucent panes 2, 2a. On the back 3 of this casing is placed a chest 4, containing all the mechanical parts to be described hereafter. The front 5 of this chest assumes the shape of an instrument panel which is simplified but however comprises a simulated artificial-horizon 6, a simulated turn-and-bank indicator 7, a simulated ball-clinometer 8, a simulated anemometer 9 and a simulated compass 10.

The floor 11 supports pedals 12, 12a and a joy stick 13 of any type, associated with resistance loading devices 14 and 15 for the simulated rudder, 16 and 17 for the simulated elevator, and 18 and 19 for the simulated ailerons. These resistance loading devices which simulate the hinge moments of the actual control surfaces of an aircraft may consist of spiral or leaf springs or of elastic cords. It goes without saying that they may be arranged in any other suitable way instead of as illustrated.

The simulated artificial-horizon 6, as concerns the simulated elevator control, is operated through the joy stick 13, pivoted on the pin 20 and connected to a control assembly for producing the simulation of the elevator control of said aircraft. Said control assembly comprises a shaft 21 rotary driven by means of the connecting rod 22 provided with terminal swivel-joints as for conventional joy-sticks, the crank-lever 23, the connecting rod 24 and the spring 25 fixed to the shaft 21, the axis of said shaft simulating the pitching axis of said aircraft.

Said spring 25 which simulates the stabilizing characteristics of the tail assembly about the pitching axis of said aircraft, is illustrated as a conventional leaf spring, but any other resilient device, with or without a linear law of deformation, may be used. The rotation of the shaft 21 is suitably checked by means of a brake, adjustable if wanted, comprising a cylinder 26 fixed on the chest 4 and a piston 27 movable within this cylinder and connected to the shaft 21 through a crank lever 28, said brake simulating the aerodynamic damping effects of said aircraft about its pitching axis. The shaft 21 carries a pendulum 29, placed in an unstable position, adjustable vertically and which simulates the inertia effects of said aircraft about its pitching axis. Thus, as soon as the pendulum 29 moves away from its normal position at the vertical of the shaft 21 corresponding to the simulated normal flight condition, this pendulum causes a moment, which is balanced by an equal moment caused by the elastic force of the spring 25. Through the parallel crank levers 30, 30a and the connecting rods 31, 31a the shaft 21 controls a frame 32, pivoted to a bracket 33 secured on the back wall of the chest 4. The frame 32 supports the mock-up 34 of the simulated aircraft, which mock-up moves behind the dial of the simulated artificial-horizon 6.

By means of the combination of the unstable pendulum, the spring and the brake, it is possible to simulate the inertia, deviation-movements and dampening characteristics of the aircraft.

For the operation of the simulated artificial-horizon 6 transversally, the joy stick 13 is connected to a control assembly for producing the simulation of the aileron control of said aircraft. Said control assembly comprises a shaft 35 the axis of which simulates the rolling axis of said aircraft and which is rotated through the tubular bar 36, the lever 37, the connecting rod 38 and the spring 39 simulating the stabilizing characteristics of the tail assembly about the rolling axis of said aircraft and to which also apply the remarks made above for the spring 25. The rotation of the shaft 35 is suitably checked by means of a brake comprising a cylinder 40 secured to the chest 4 and a piston 41 movable within this cylinder and connected to the shaft 35 through the crank lever 42, said brake simulating the aerodynamic damping effects of said aircraft about its rolling axis. An unstable pendulum 43, adjustable vertically and simulating the inertia effects of said aircraft about its rolling axis, is mounted on the shaft 35, which drives a parallel shaft 44, through levers 45, 46 and a connecting rod 47. The shaft 44 carries at its end the figurative horizon mock-up 48 of the simulated artificial-horizon 6.

The simulated anemometer is operated by means of a combining lever, simultaneously engaged by the transverse shaft 21 and the fore-and-aft shaft 35, so that the indications shown on the anemometer depend both on the absolute values of the simulated angle of bank and of the simulated angle of fore-and-aft slope.

The combining lever 49 is actuated at one end by the lever 50 driven by the lever 51 carried by the transverse or pitching shaft 21, and at its other end by the member 52 driven by the lever 53 secured to the fore-and-aft or rolling shaft 35. The combining lever 49 is maintained laterally by a lever 54, pivoted to a fixed bracket 55. The lever 54 is pivoted to the lever 49 by a pivot-pin which is common to the member 52 and this lever 49.

At the desired point of the combining lever 49, chosen in accordance with the characteristics of the device to indicate a decrease of the lift when the aircraft banks, is pivotally connected a computing transmission connected in turn to the simulated anemometer. Said computing transmission comprises a connecting rod 56 which, through the spring 57, shown as a leaf spring, controls the rotation of a shaft 58 which is perpendicular to the dash-board 5. The rotation of the shaft 58 which depends on the pivotal movement of the joy-stick around the pivot pin 20 and therefore on the simulated angle of fore-and-aft slope, is suitably delayed by a brake 60 through a lever 59. The shaft 58 actuates, through the toothed segment 61 and the gear pinion 62, the pointer 63 of the simulated anemometer 9. Now the speed of an aircraft depending on the angle of fore-and-aft slope induced by the elevator control, the indications given by the pointer 63 depending on the simulated fore-and-aft slope are related to the simulated aircraft speed. The brake 60 simulates the delay in operation of an actual anemometer.

The control of the simulated turn-and-bank-indicator 7 is also made by a combining lever, so that the indications of this instrument will simultaneously depend on the simulated deflection of the rudder and on the secondary effect of the simulated angle of bank.

The pedals 12, 12a control a third control assembly for producing the simulation of the rudder control of said aircraft. Said control assembly comprises a shaft 64 the axis of which simulates the yawing axis of said aircraft and which is rotated through the connecting rods 65, 65a, the differential lever 66 pivoted at 67, the connecting rod 68 and the spring 69 simulating the stabilizing characteristics of the tail assembly about the yawing axis of said aicraft. The rotation of the shaft 64 is suitably checked by the lever 70 which engages the brake 71 simulating the aerodynamic damping effects of said aircraft about its yawing axis. The thus obtained simulated rudder control assembly is connected to a pivot pin 77 acting as a combining lever through a rod 72 which is a continuation of the brake piston rod and which interconnects the lever 70 and a lever 73 carried by a rotating shaft 74 which carries a lever 75 connected by means of a connecting rod 76 to the pointer 78 of the simulated turn-and-bank indicator 7, which pointer is rotary mounted on said pivot pin 77. The effect of the simulated bank is transmitted from the simulated aileron control assembly to the combining lever 77 by combining lever 77 which is carried by a computing transmission formed by a pair of parallel twin levers 81, 81a, which rotate together about the axis 82. The connecting rod 80 engages the lever 81a to move the combining lever 77 along a circle centred at 82, which modifies the rotation of the pointer 78 as would be obtained by the action of the pedals only.

For the control of the transverse simulated clinometer 8, which is a "ball clinometer," the position of the ball is arranged to depend both on the simulated angle of bank and on the simulated rate of turn due to the simulated deflection of the rudder.

A combining lever 83 is simultaneously connected to the simulated aileron control assembly for receiving the signal of simulated bank through the lever 84 pivoted at one of its end and actuated by a lever 85 carried by the fore-and-aft or rolling shaft 35, and to the simulated rudder control assembly for receiving the simulated rudder signal through the lever 73 pivoted at its other end.

At a suitably chosen point of this lever 83, there is connected a computing transmission comprising a connecting rod 86, which through the lever 87 and the shaft 88 controls the inclination of the arcuate tube 89 of the simulated clinometer 8. Said arcuate tube 89 moves with respect to the dash-board, contrarily to what actually occurs in an aircraft.

The simulated compass operates as follows, in accordance with the indications of the simulated turn-and-bank-indicator 7, i.e. through the secondary effect of the simulated rudder deflection under the action of the simulated rudder control assembly and the tertiary action of the simulated angle of bank under the action of the simulated aileron control assembly. Behind the dial of the simulated compass 10, the rose compass-card 90 is adapted to rotate around the vertical axis 91. The compass-card 90 is driven by a computing transmission comprising the gear wheels 92, 93 and the two-way motor 94 fed by two batteries 95, 95a through two separated resistors 96, 96a, wound on a common core 97 and engaged by a wiper 98 fast with the pointer 78 of the simulated turn-and-bank indicator 7. This computing transmission is thus simultaneously connected to the simulated rudder and aileron control assemblies through the combining lever 77. The more the pointer 78 moves from its mean position, the smaller the resistance connected into the motor circuit from the resistor 96 or 96a and the higher the rotational speed of the motor 94.

The thus described gear is adapted to determine the aptitude of the trainees for flying and to provide for the elementary training, the development of reflex actions and blind flying teaching, the artificial horizon being screened for the latter.

Of course, without departing from the scope of the present invention as defined in the appended claims, changes could be made in the described training gear. In particular, other control instruments could be added with the aid of other devices to simulate flying conditions and transmit their combined effects.

What I claim is:

1. A training gear for the elementary teaching of aircraft piloting comprising, in combination, control members, namely a pair of pedals and a joy-stick, devices to urge said stick and said pedals to their neutral position and to simulate the hinge moments of actual control surfaces of an aircraft, two control assemblies respectively connected to said joy-stick for producing the simulation of the aileron and elevator controls of said aircraft, a third control assembly connected to said pedals for producing the simulation of the rudder control of said aircraft, said three control assemblies respectively comprising, with respect to rolling, pitching and yawing axes simulating those of said aircraft, means for simulating the stabilizing characteristics of the tail assembly of said aircraft and means for simulating the aerodynamic damping effects of said aircraft, the simulated aileron and elevator control assemblies further comprising means for simulating the inertia effects of said aircraft about its rolling and pitching axes, a first simulated indicating-instrument having two indicating members, transmission for respectively operating said indicating members and directly connected to the simulated aileron and elevator control assemblies, respectively, a group of other simulated indicating-instruments, transmissions for respectively operating said other simulated indicating-instruments and comprising computing transmissions connected to said other simulated indicating-instruments, respectively, and combining levers having ends connected to two of said three control assemblies, said levers being respectively connected at an intermediate point to said computing transmissions, thereby to modify the operation of each computing transmission by the combination of the action of the corresponding simulating means, so as to provide on said other simulated indicating-instruments the representation of equations reproducing the true flying equations of said aircraft.

2. A training gear according to claim 1, arranged in a cabin structure having opaque walls with translucent panels, so that the pilot may be put under blind flying conditions.

3. A training gear according to claim 1, wherein each control assembly and the corresponding means for simulating the stabilizing characteristics of the tail assembly of the aircraft and the aerodynamic damping effects of the aircraft comprise a horizontal rotary shaft, a resilient system carried by said shaft and connected to the corresponding control member for controlling the rotation of said shaft through said resilient system, said resilient system having characteristics which reproduce the stabilizing characteristics of the tail assembly of the aircraft about the corresponding axis, a brake of the dashpot type generating damping effects reproducing the aerodynamic damping effects of said aircraft about the corresponding axis, means for connecting said brake to said shaft whereby the rotation of said shaft is checked, and means for connecting said shaft to the transmission operating the corresponding simulated instrument.

4. A training gear according to claim 3, wherein the means for simulating the inertia effects of the aircraft for the simulated aileron and control assemblies comprises, for each assembly, an adjustable pendulum disposed at the vertical of the corresponding rotary shaft and means for connecting said pendulum to the corresponding rotary shaft, the characteristics of said adjustable pendulum being determined so that as soon as said pendulum moves away from its unstable normal position at the vertical of said shaft it causes a moment which is balanced by an equal moment caused by the elastic force of the corresponding resilient system and which reproduces the inertia effects of the aircraft about the corresponding axis.

5. A training gear according to claim 3, wherein the resilient system has a linear law of variation.

6. A training gear for the elementary teaching of aircraft piloting comprising, in combination, control members, namely a pair of pedals and a joy-stick, devices to urge said stick and said pedals to their neutral position and to simulate the hinge moments of actual control surfaces of an aircraft, two control assemblies respectively connected to said joy-stick for producing the simulation of the aileron and elevator controls of said aircraft, a third control assembly connected to said pedals for producing the simulation of the rudder control of said aircraft, said three control assemblies respectively comprising, with respect to rolling, pitching and yawing axes simulating those of said aircraft, means for simulating the stabilizing characteristics of the tail assembly of said aircraft and means for simulating the aerodynamic damping effects of said aircraft, the simulated aileron and elevator control assemblies further comprising means for simulating the inertia effects of said aircraft about its rolling and pitching axes, a simulated artificial horizon with two mock-ups respectively connected to the simulated aileron and elevator assemblies for simulating the fore-and-aft and lateral trims of the aircraft, a group of other simulated indicating-instruments, transmissions for respectively operating said other simulated indicating-instruments and comprising computing transmissions connected to said other simulated indicating-instruments, respectively, and combining levers having ends are connected to two of said three control assemblies, said levers being respectively connected at an intermediate point to said computing transmissions, thereby to modify the operation of each computing transmission by the combination of the action of the corresponding simulating means, so as to provide on said other simulated indicating-instruments the representation of equations reproducing the true flying equations of said aircraft, said group comprising a simulated anemometer, a simulated turn-and-bank indicator, a simulated clinometer and a simulated compass.

7. A training gear according to claim 6, wherein the combining levers comprise, for the simulated-anemometer, a lever inserted between the simulated aileron and elevator control assemblies so that the indications shown on said anemometer depend both on the absolute values of the simulated angle of bank and of the simulated angle of fore-and-aft slope; for the simulated turn-and-bank indicator and compass, a lever inserted between the connection of the simulated lateral trim mock-up with the simulated aileron control assembly and the connection of said indicator with the simulated rudder control assembly so that the indications shown on said indicator and compass depend on the simulated deflection of the rudder and secondary effect of the simulated angle of bank; and, for the simulated-clinometer, a lever inserted between the simulated aileron and rudder control assemblies so that the indications of said clinometer depend both on the simulated angle of bank and on the simulated rate of turn due to the simulated deflection of the rudder.

8. A training gear according to claim 7, wherein the computing transmission for the simulated-compass comprises a two way electric micro-motor, two current sources, two open circuits respectively connecting said sources to said motor, two resistors respectively inserted into said circuits, a common case on which said resistors are wound, a wiper fast with the pointer of the simulated-turn-and-bank indicator, electrically connected to said motor and adapted to engage either resistor for closing either open circuit, and means for mechanically connecting said motor to the rose of the simulated-compass.

References Cited in the file of this patent

UNITED STATES PATENTS

| | | |
|---|---|---|
| 2,090,132 | Lacoe | Aug. 17, 1937 |
| 2,319,115 | Crowell | May 11, 1943 |
| 2,341,253 | West | Feb. 8, 1944 |
| 2,409,238 | Barber | Oct. 15, 1946 |
| 2,472,888 | Cunningham | June 14, 1949 |
| 2,485,286 | Hayes | Oct. 18, 1949 |
| 2,510,174 | Heller | June 6, 1950 |
| 2,618,867 | Coppens | Nov. 25, 1952 |
| 2,620,463 | Meredith | Dec. 2, 1952 |
| 2,686,979 | Benson et al. | Aug. 24, 1954 |